US006792595B1

(12) United States Patent
Storistenau et al.

(10) Patent No.: US 6,792,595 B1
(45) Date of Patent: Sep. 14, 2004

(54) SOURCE EDITING IN A GRAPHICAL HIERARCHICAL ENVIRONMENT

(75) Inventors: Adrian Storistenau, Toronto (CA); Robert Weisz, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,235

(22) Filed: Sep. 16, 1999

(30) Foreign Application Priority Data

Dec. 23, 1998 (CA) ............................................. 2256931

(51) Int. Cl.[7] ................................................ G06F 9/44
(52) U.S. Cl. ...................... 717/110; 717/109; 717/113; 717/116; 717/125; 707/513; 345/650; 345/676
(58) Field of Search ......................... 717/113, 105–110, 717/116, 125; 345/645, 650, 676, 762–763, 713; 707/513

(56) References Cited

U.S. PATENT DOCUMENTS

| | | | | | |
|---|---|---|---|---|---|
| 5,379,366 | A | * | 1/1995 | Noyes .......................... | 706/55 |
| 5,511,158 | A | * | 4/1996 | Sims .......................... | 345/440 |
| 5,617,539 | A | * | 4/1997 | Ludwig et al. ............. | 709/205 |
| 5,729,674 | A | * | 3/1998 | Rosewarne et al. ......... | 345/634 |
| 5,754,851 | A | * | 5/1998 | Wissner .................... | 707/104.1 |
| 5,794,006 | A | * | 8/1998 | Sanderman ................. | 709/223 |
| 5,872,974 | A | * | 2/1999 | Mezick ....................... | 717/109 |
| 5,960,447 | A | * | 9/1999 | Holt et al. .................. | 715/500 |
| 6,002,850 | A | * | 12/1999 | Sumino et al. ............. | 709/315 |
| 6,029,182 | A | * | 2/2000 | Nehab et al. ............... | 707/523 |
| 6,167,406 | A | * | 12/2000 | Hoskins et al. ............. | 707/102 |
| 6,185,591 | B1 | * | 2/2001 | Baker et al. ................ | 707/531 |
| 6,189,143 | B1 | * | 2/2001 | Simonyi ..................... | 717/109 |
| 6,237,135 | B1 | * | 5/2001 | Timbol ....................... | 717/107 |
| 6,243,859 | B1 | * | 6/2001 | Chen-Kuang ............... | 717/111 |
| 6,257,774 | B1 | * | 7/2001 | Stack .......................... | 717/110 |
| 6,263,339 | B1 | * | 7/2001 | Hirsch ........................ | 707/102 |
| 6,269,275 | B1 | * | 7/2001 | Slade .......................... | 700/90 |
| 6,292,804 | B1 | * | 9/2001 | Ardoin et al. .............. | 707/102 |
| 6,314,555 | B1 | * | 11/2001 | Ndumu et al. .............. | 717/101 |
| 6,377,259 | B1 | * | 4/2002 | Tenev et al. ................ | 345/440 |
| 6,446,081 | B1 | * | 9/2002 | Preston ..................... | 707/104.1 |
| 6,470,482 | B1 | * | 10/2002 | Rostoker et al. ............. | 716/6 |
| 6,473,794 | B1 | * | 10/2002 | Guheen et al. ............. | 709/223 |
| 6,493,868 | B1 | * | 12/2002 | DaSilva et al. ............. | 717/105 |
| 6,601,233 | B1 | * | 7/2003 | Underwood ................ | 717/102 |

OTHER PUBLICATIONS

Title: Abstract interaction tools: a language for user interface management systems, author: Jan Van Den Bos, source: ACM, Apr. 1988.*
Title: Hypertext paradigm in the field of information retrieval: a neural approach, author: Lelu Alain, source: ACM, 1992.*
Title: Interaction in really graphical user interfaces Viehstaedt, G.; Minas, M. Visual Languages, 1994. Proceedings., IEEE Symposium on , 1994.*
Title: Interactive Editing Systems: Part II, author: Meyrowitz et al, ACM, Sep., 1982.*
Title: An Experimental System for Creating and Presenting Interactive Graphical Documents, author: Feiner et al, ACM, 1982.*
Technical Disclosure Bulletin 10–91 p332–337—Symbol Table Based Program Editor.

* cited by examiner

Primary Examiner—Chameli Das
(74) Attorney, Agent, or Firm—David A. Mims, Jr.

(57) ABSTRACT

This invention relates to a method for viewing, writing, and modifying source code in an integrated development environment (IDE). When source code is being edited in a graphical environment, windows in the development environment display the code structure of a project allowing for the visualization of the relationships between components of the project. This invention discloses a system and method that permits editing to be performed directly in the graphical environment where the code structure is being displayed. In the preferred embodiment, editing of the source is performed directly within the graphical environment where a hierarchical model of the code structure of a project at various levels (module, class, function, etc.) is displayed.

2 Claims, 6 Drawing Sheets

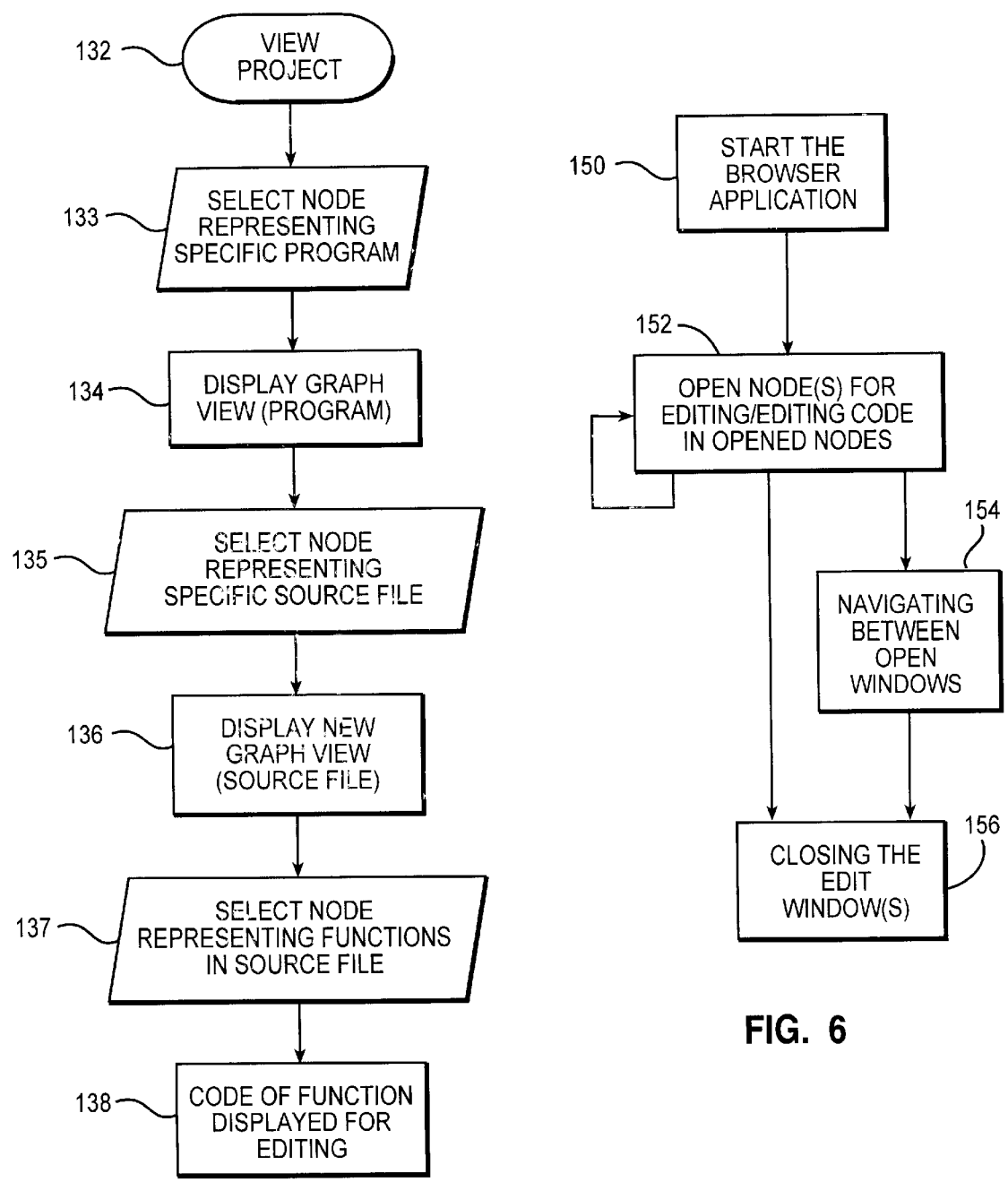

SOURCE EDITING IN A GRAPHICAL HIERARCHICAL ENVIRONMENT

FIELD OF THE INVENTION

This invention relates to integrated development environments (IDEs). This invention also relates to a method for editing source code in a graphical environment, where the interdependencies between components of a program are modeled and displayed in a graphical view. In particular, this invention relates to a method for editing source code directly in the graphical view where the interdependencies between components of a program are modeled.

BACKGROUND OF THE INVENTION

Current integrated development environments (IDEs) typically comprise separate windows or panes for the display of the code structure in a project, and for the editing of source files. Typically, the window which displays the code structure in a project provides for a graphical, hierarchical model of the interdependencies between various components of the underlying program(s). For example, in certain object-oriented programming environments, the display may reveal which packages may be contained in a specific project, which classes or modules may be contained within such packages or projects, and which methods, functions, procedures, or other subroutines may be defined within those classes or modules. In some instances, the interactions between the various methods (functions, procedures, or other subroutines), namely, whether or not they call themselves or each other, may also be apparent from the graphical display.

In these environments, when it is necessary to read, write, or modify the source code for a particular component, a separate window will be created for this purpose. This window appears disjointed from the graphical model where the relationships between the various program components are being displayed. The user must utilize and separately examine each of the multiple windows, and navigate between them when performing an editing task. As a result, the modifications performed on the various components are not done within the context of the overall program structure.

U.S. Pat. No. 5,490,246 discloses a graphics editor which permits complex graphical images to be formed and edited. The graphics editor generates a graph with nodes that represent image fragments, image transformations, and outputs (viewable images). Each of these nodes can be displayed in a separate viewing window and may be modified. Although the interdependencies of the various components are graphically displayed, the window displaying a component is not opened directly or positioned appropriately on the graph which models the relationships between the components. Furthermore, the invention is for editing graphic images and not for editing source code.

U.S. Pat. No. 5,642,475 discloses an apparatus and method for editing multiple graphic images displayed on a screen and correlated to each other. The invention relates to hierarchically structured graphics formed from other graphics, where changes in the view of one graphic may be performed in response to changes on another graphic which it relates to. This invention does not address the fact that the component windows are being displayed out of the context of the overall hierarchy, and further, the invention is for editing graphic images and not for editing source code.

European patent application EP 753814-A2 discloses a method and apparatus for analyzing source code to determine the dynamic properties of a program. In one embodiment of the invention, a flow graph may also be generated from the output of a source code analyzer. This invention does not relate to the editing of source code, nor does it allow for such editing to occur in windows situated appropriately on the flow graph.

U.S. Pat. No. 5,671,416 discloses an apparatus and method for searching through a parse tree of source code of a program, to allow for easier and more efficient debugging and modification of the program. Although this invention relates to the editing of source code, it does not provide a graphical, abstract view of the interdependencies of the components of the program, and further, does not allow for editing of the source code directly in that view.

It will be appreciated by those skilled in the art, that program comprehension will be enhanced where the interdependencies between various components of a program are made readily apparent. Furthermore, code maintenance and development can be made easier if the scope of desired changes can be readily determined during the editing process, by providing an interface that displays the source code of a program in a view where the interdependencies of the program components are displayed.

SUMMARY OF THE INVENTION

It is an object of the present invention to provide a system where modifications performed on various components of a computer program are done directly in the context of the overall program structure.

The invention provides for a system and method that allows for the view of the interdependencies of the components of a program to be combined with a view of the source code of the program in the visual interface of a programming environment.

According to one aspect of the invention, the interdependencies of the components of a program are displayed in a graph where the nodes of the graph represent sub-components of components of the program, and where the edges of the graph represent interdependencies between the sub-components displayed as nodes. The source code of a sub-component of a component of the program can be viewed and edited in a window that replaces the node in the graph that represents the sub-component.

Thus, the present invention is directed to a system for editing a computer program which comprises a plurality of source code components. The system includes a browser, a graphical layout control accessible to and invokable by the browser to display the relationships between said source code components as interconnected nodes, and an edit control accessible to the browser. The edit control has a plurality of edit views and edit windows. Each of the edit views corresponds to a portion (which could be the entirety) of one of said source code components and each of the edit windows provides a user interface to one of the source code components corresponding to an edit view, which enables the user to edit one of said source code components.

According to a further aspect, the present invention provides a method for editing a computer program which consists of the steps of displaying to a user a hierarchical relationship between source code components of the computer program in which each component is represented as a node, and repetitively providing means to allow the user to select one of the nodes for editing and replacing the selected node with an edit window displaying the source code component in order to permit the user to edit the source code component while viewing the hierarchical relationship.

In yet a further aspect, the present invention provides a system for editing a computer program having a browser, and a graphical layout control accessible to the browser. The graphical layout control May be invoked by the browser to provide a display of relationships between components of said computer program. The system also includes an edit control accessible to the browser. The edit control provides an interface to permit a user to select a component from within the display. An edit window containing the contents of the selected component is also provided. This window replaces the selected component within the display, for the purpose of allowing the user to edit the contents of the selected component while viewing the display of relationships.

Media embodying program instructions for use in the execution in a computer to perform the invention described herein, is a further aspect of the invention.

BRIEF DESCRIPTION OF THE DRAWINGS

A preferred embodiment of the present invention will now be described, by way of example only, with reference to the accompanying drawings, in which:

FIG. 5 is a flow diagram illustrating how the components of a program are displayed by the present invention; and FIG. 6 is a flow diagram illustrating the steps in a typical operational scenario of the present invention.

DETAILED DESCRIPTION OF THE PREFERRED EMBODIMENT

Within this specification including the claims, the following terms will be used:

Edit Control An Edit Control is an object that co-ordinates and links together a number of related Edit Views and Edit Windows.

Edit View An Edit View comprises essentially all the data structures that manipulate a document loaded in an editor. That is, an Edit View is a snapshot of a portion of the whole of a document or a segment of a document without the visual window to show it.

Edit Window The Edit Window gives an Edit View a window frame and provides the interface between the user and the document or segment of the document contained in the associated Edit View.

Graph View A Graph View is a graphical representation of a structure that can be modeled using a combination of nodes and links connecting the nodes.

In the preferred embodiment, the present invention provides the facility to expand a graphical node representing a segment of source code in a graphical hierarchical environment (hereinafter referred to as a "browser") into a fully-featured Edit Window which displays the text of the segment of source code.

The browser is, for example, a static navigator, a class browser, or a design application that displays the block diagram or the flowchart of a program or a project. The browser application that implements the present invention utilizes a graphical layout control. The expansion of a graphical node as described above can be performed upon a user's request, typically by moving a cursor over a target node and selecting that node by clicking the pointing device (e.g. mouse) or by executing one or several keystrokes. Both operational and navigational capabilities of the browser as well as source code editing capabilities are preserved and fully integrated into one browser application window.

Prior to discussing the implementation details of the present invention, reference will be made to FIGS. 1–3 which illustrate a sample scenario of editing source code within the browser as described above.

Figure 1:
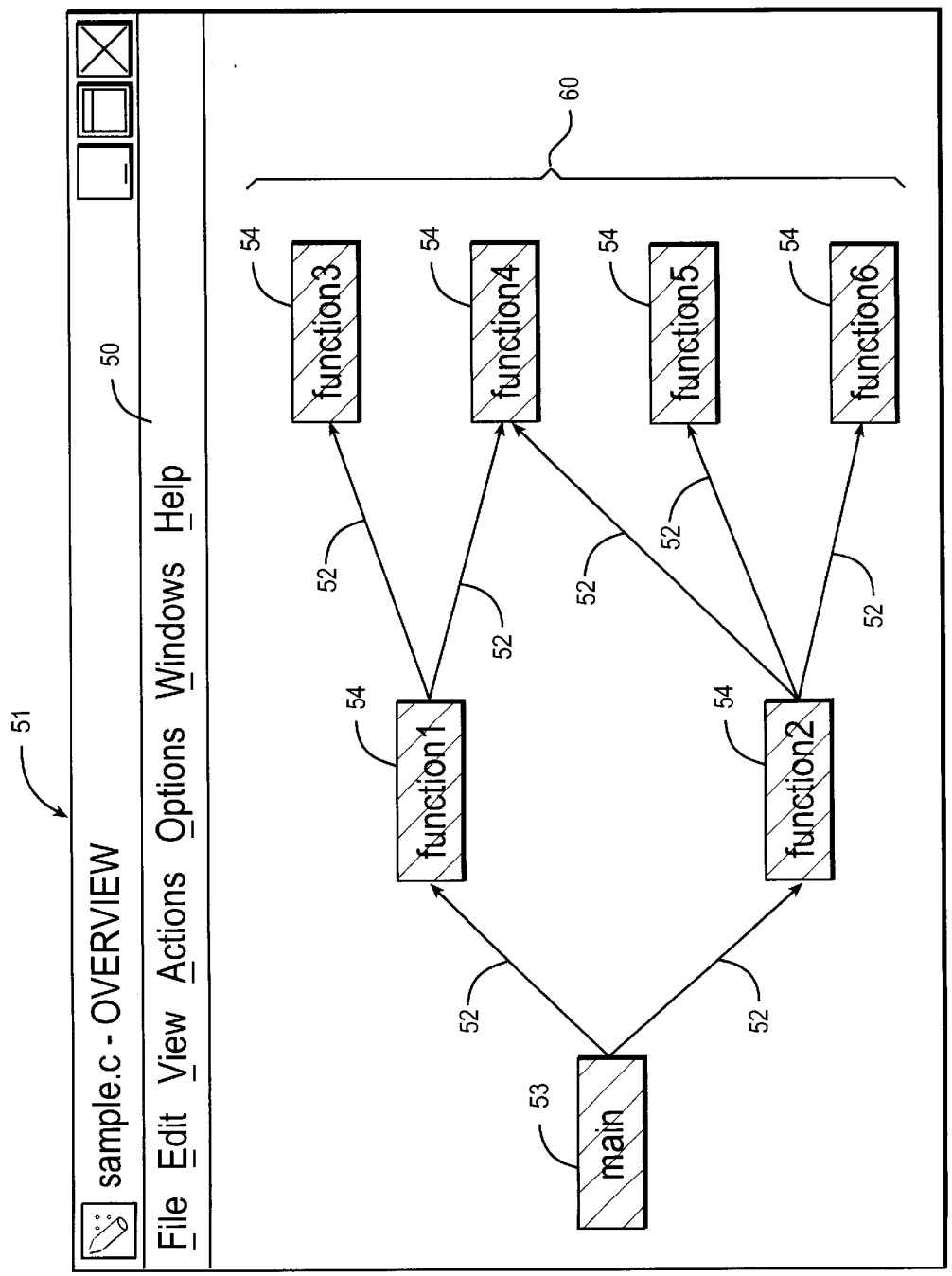
FIG. 1 is a screen capture illustrating a series of dependent nodes.

FIG. 1 shows a browser application window 50 for a C programming language source file, named sample.c, as indicated in the title bar 51. Within the browser application window 50 is an initial Graph View 60. The information in the initial Graph View 60 is based upon information stored in a database within a file system about the program sample.c. The Graph View 60 presented in the browser application window 50 serves as a function-level overview of the source file contents, and as a starting point for editing operations in the source file.

In an alternative embodiment of the invention, the Graph View 60 may be embedded in a higher-level graph. For example, a graph that represents a program comprising multiple source files may in turn be embedded in a graphical representation of an entire project.

Referring to FIG. 1, the program source sample.c consists of seven functions. The program source code consists of the following functions: main, function1, function2, function3, function4, function5 and function6. The initial Graph View 60 provides a hierarchical graphical representation of how these functions relate to each other through the presence of links 52. In this figure, the root represents main, and is illustrated as root node 53. Links 52 are directed and indicate where a function represented by a node calls the function of the node to which the link 52 is directed. Thus main calls both function1 and function2, function1 calls both function3 and function4, and function2 calls each of function4, function5 and function6.

Figure 2A:
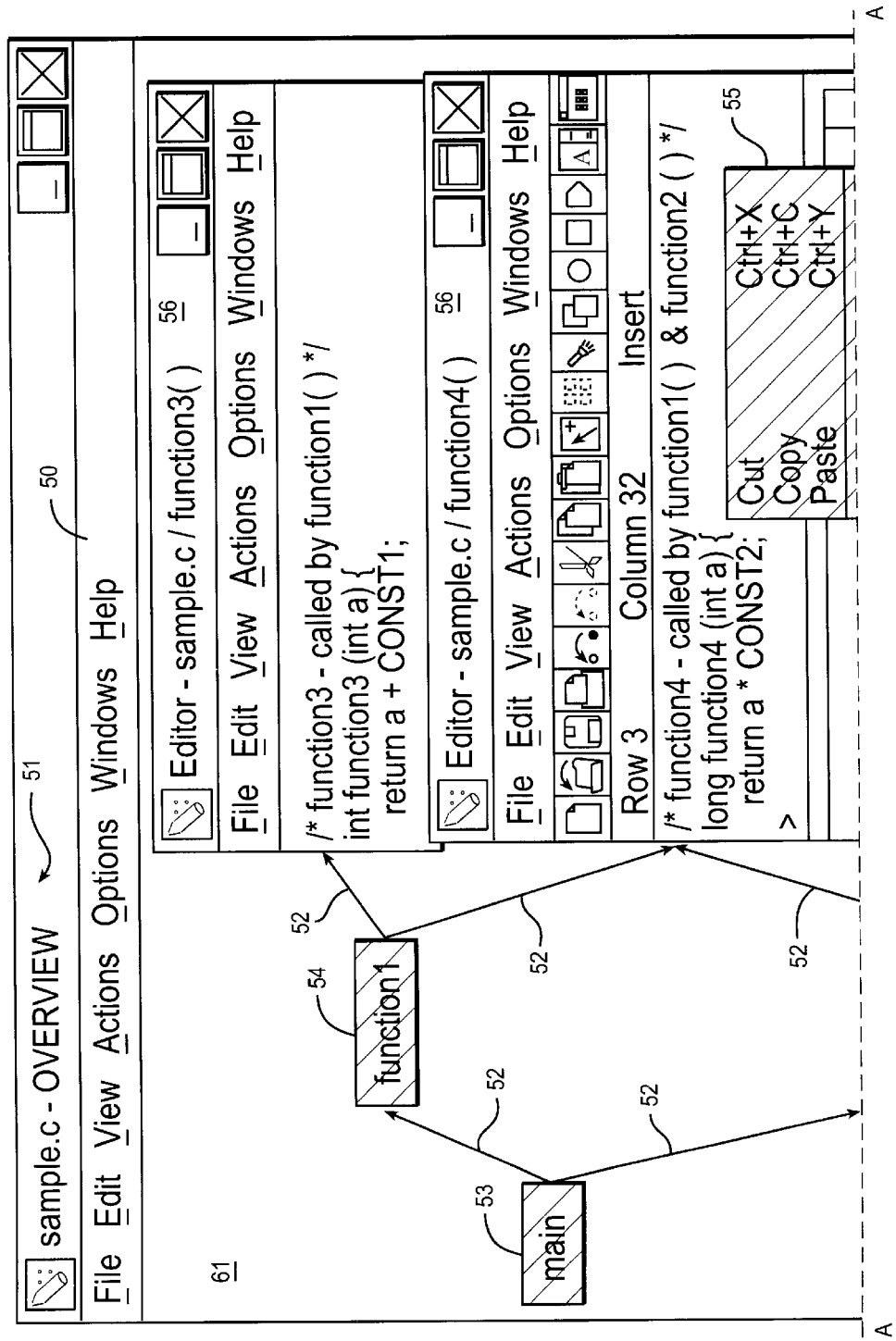
FIGS. 2A and 2B are a screen capture illustrating a series of dependent nodes.
Figure 2B:
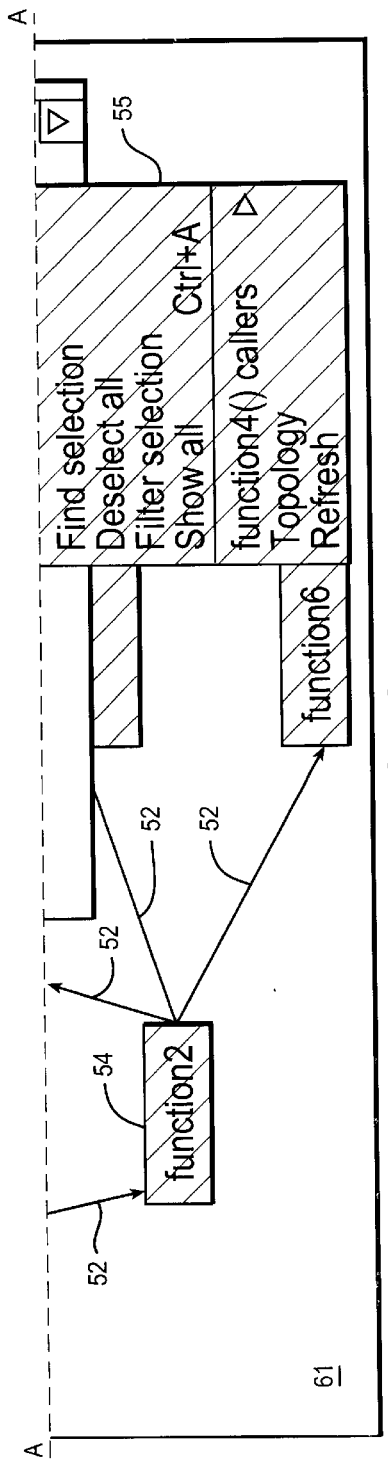

Referring to FIGS. 2A and 2B, a new Graph View 61 is shown with two source nodes 54 opened for browsing. A pop-up menu 55 associated with a source node 54 is opened for browsing or editing the segment of code that the selected source node 54 represents, or for browsing or editing the segment of code for any other function that calls or is called by the component represented by the selected source node 54 as indicated by the links 52. The choices available in the pop-up menu 55 comprise:

a) normal editing actions, for example: Cut, Copy, Paste, Find selection, Deselect all, Filter selection, Show all; and b) options normally available in a Graph View 61, for example:

i) a list of other components which call on a component associated with a source node 54 which can be opened for editing from a pop-up menu 55;

ii) an action that opens a new window (not shown) displaying the topology of the current file or project; and iii) an action to refresh the Graph View 61, to reflect changes made to the components of the program.

In the preferred embodiment of the invention, the topology of a file or project consists of statistical information (e.g. total number of functions in a file), and information with respect to callers and callees (e.g. who calls whom).

As shown in FIGS. 2A and 2B, the user has opened source node 54 representing a function named function3 for editing, resulting in the opening of a new Edit Window 56 where the code for function3 is displayed. Once the source node 54 is selected by the user, an underlying Edit Control (not shown in FIGS. 2A and 2B) is initialized. This initialization begins with the loading of the file sample.c into the Edit Control. A parser registered to the underlying Edit Control tokenizes and colorizes the file according to C-language syntax. The Edit Window 56 is made to display only the segment of code that is contained within the source node 54, in this case, the source code for function3. Menu items are added to the menus of the Edit Window 56 for C-related user actions in the Edit View. These menu items may consist of (but are not limited to) the following:

a) Actions->Build: compiles edited code;

b) Actions->Reformat: reformats the source code text in accordance to coding standards;

c) View->Outline Logic: shows the logical outline of the code; and d) Help->C Language Reference: displays reference manual entries.

The Edit Window 56 is then resized and replaces the source node 54 representing function3 in the Graph View 61.

The user has also opened a source node 54 representing the function function4 for editing, which resulted in the opening of a new Edit Window 56 where the code for function4 is displayed. As shown, Edit Window 56 displaying the code for function4 has the current focus, while Edit Window 56 displaying the code for function3 is in the background. As each Edit Window 56 is displayed, any links 52 that pointed to or from a node replaced by that Edit Window 56 are redrawn to point to or from that Edit Window 56.

Figure 3A:
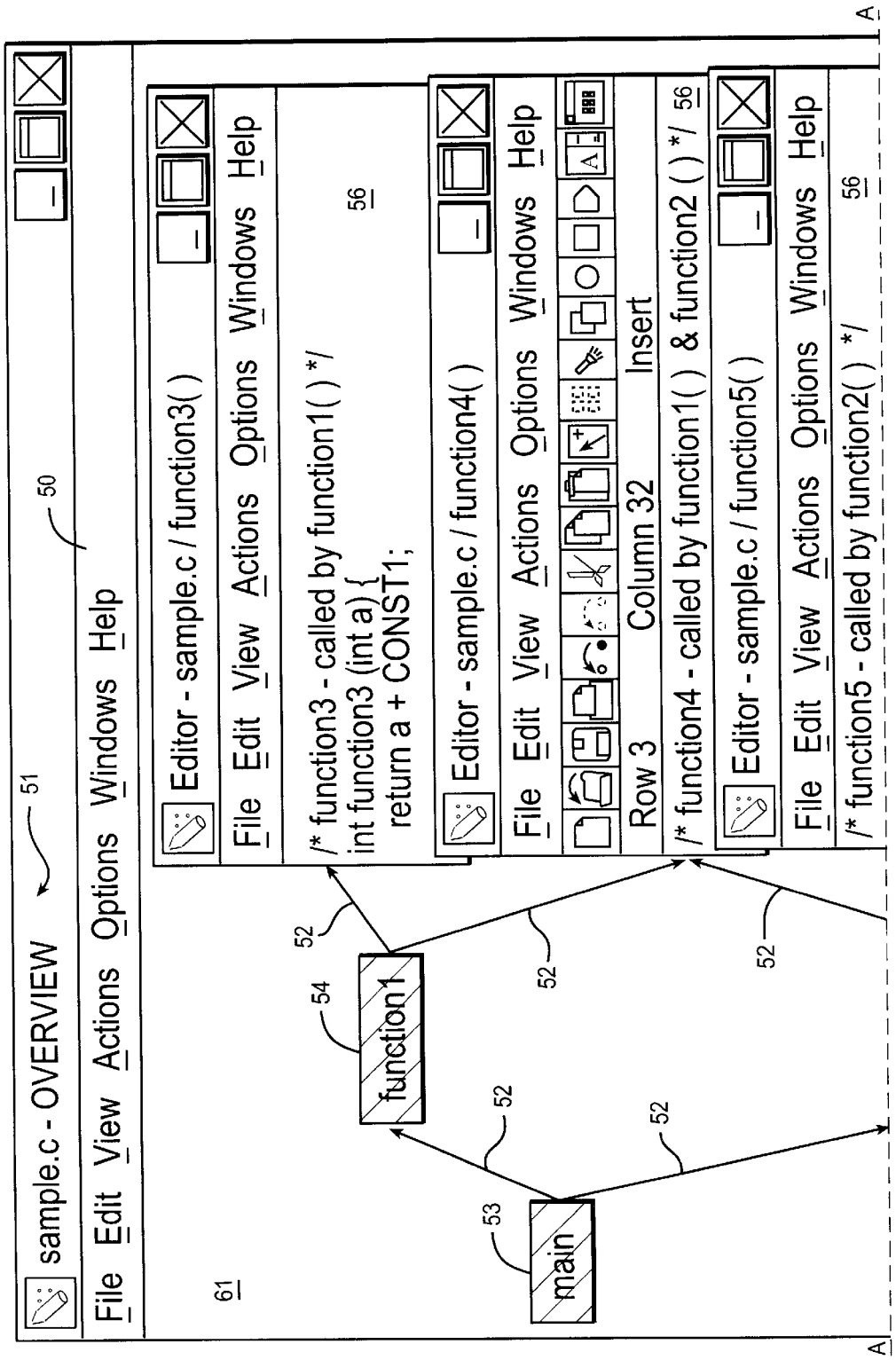
FIGS. 3A and 3B are a screen capture illustrating a series of dependent nodes with four nodes expanded.
Figure 3B:
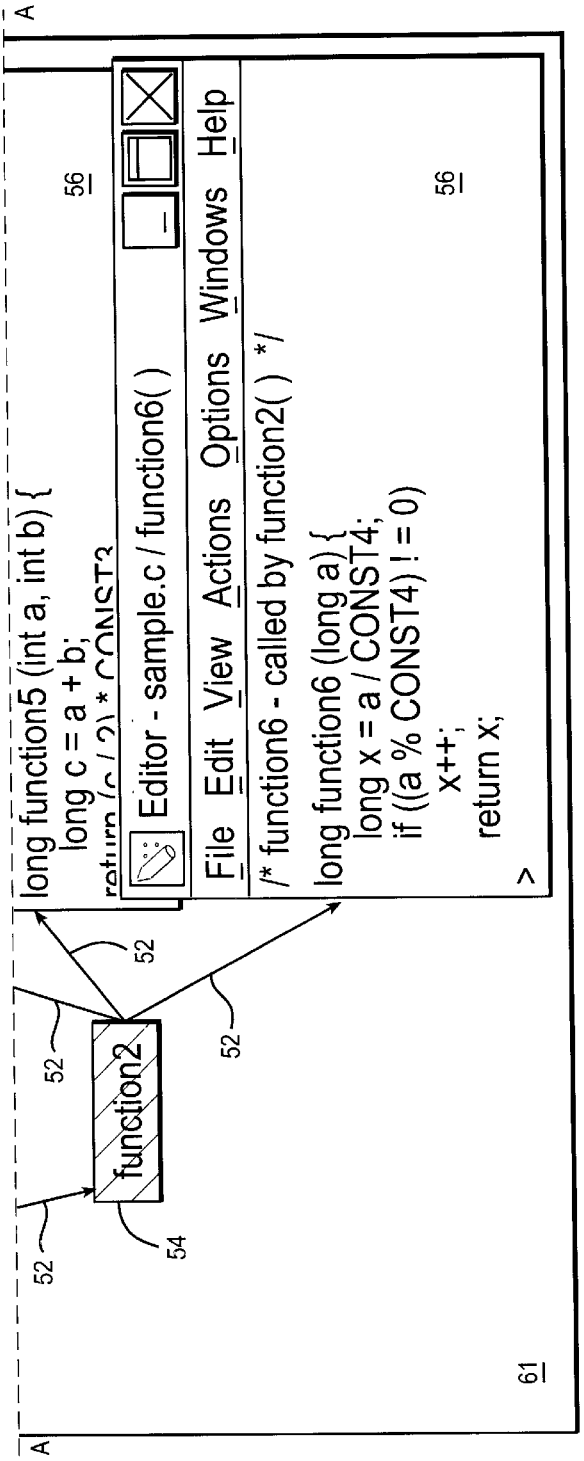

Referring to FIGS. 3A and 3B, a new Graph View 61 is shown after the user opened two more source nodes 54 for editing. FIGS. 3A and 3B illustrate three background Edit Windows 56 and an Edit Window 56 with the current focus. The links 52 between the source nodes 54 and Edit Windows 56 have been redrawn to show which components are being called by which other components in the source file.

The user may navigate between root node 53, source nodes 54 and Edit Windows 56 using navigational keys and key combinations, thereby causing the current focus to switch from component to component. If the current focus is on an unopened root node 53 or source node 54, the user will have the option of opening an Edit Window 56 for the component associated with the selected root node 53 or source node 54.

Figure 4:
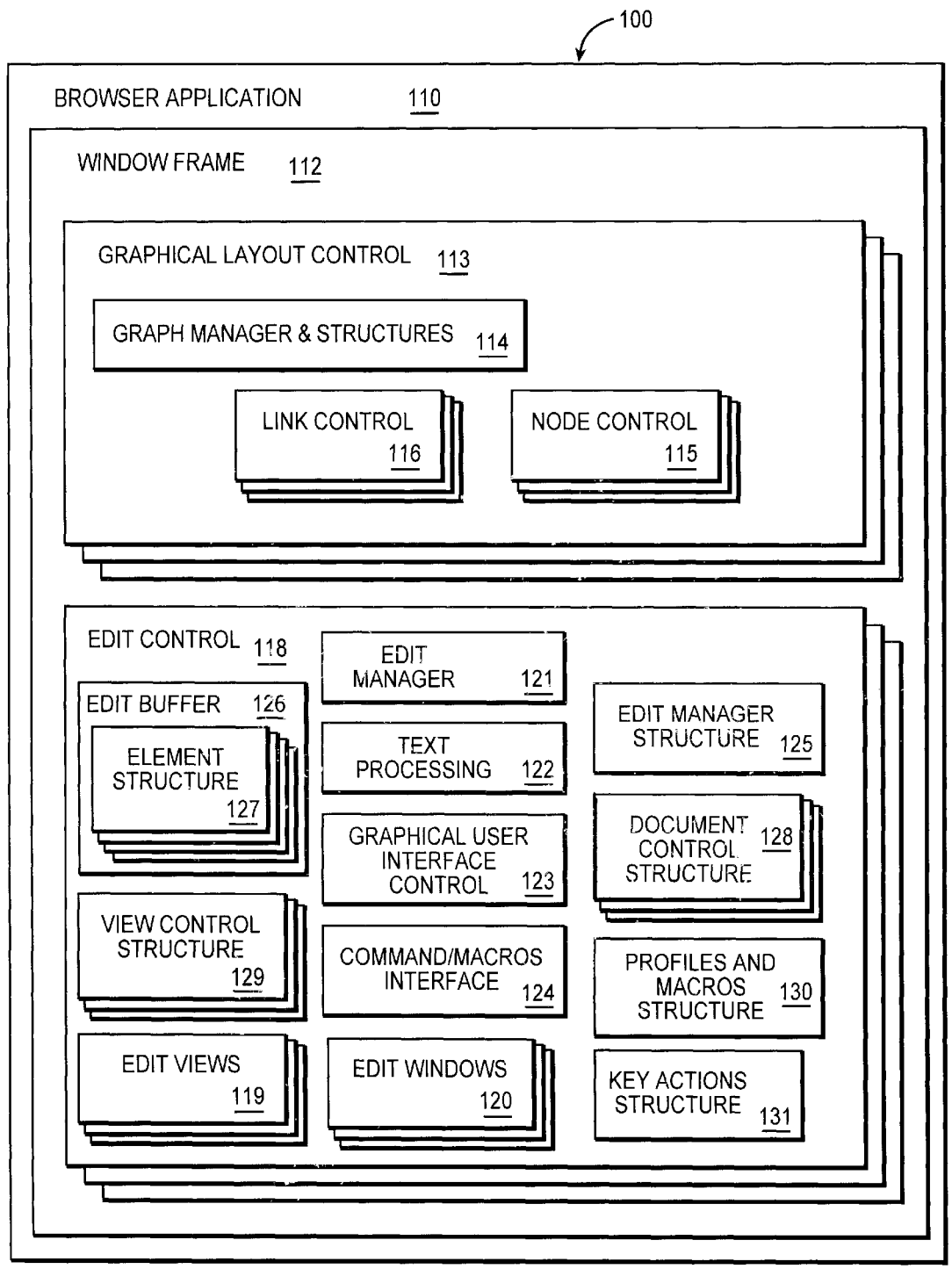
FIG. 4 is a conceptual diagram of the components of the present invention.

Referring to FIG. 4, a conceptual diagram of the components of the present invention is shown generally as 100. A browser application 110 will typically create a frame window 112 (implemented, for example, as a browser application window 50 with a title bar 51 as shown in FIGS. 1–3) within which it will set up its initial graphical layout control 113. The graphical layout control 113 consists of a graph manager and related data structures 114 required to implement a Graph View (e.g. 60 of FIG. 1). The graphical layout control 113 also contains node controls 115 which contain the data and methods necessary to implement nodes (for instance, root nodes 53 or source nodes 54 as shown in FIGS. 1–3) which are to be displayed graphically. The graphical layout control 113 also contains link controls 116 which contain the data and methods necessary to implement links (for instance, links 52 of FIGS. 1–3). The contents to be displayed within a graphical layout control 113 may be based on project information saved in a database, which for example, may be stored in a file system (not shown). It will be appreciated by those skilled in the art that such a database is not necessary for the implementation of this invention, but if used, the database may store information which includes, but is not limited to, the functions found in a specific module and their calling relationships. Alternatively, the contents to be displayed within a graphical layout control 113 may be based on a run-time analysis of the source code involved at the appropriate level of detail (e.g. project, class, module, function).

The run-time analysis information may be generated, for example, through the total parse carried out by a live, incremental parser that parses a file when the file is loaded into the browser application 110. This information records, for example, the functions found in the file, the boundaries of the code of the functions in the source document, and the hierarchical relationship between the functions (which functions are being called by themselves or other functions). The browser application 110 updates this information from time to time, in conjunction with the document updates monitored by Edit Controls 11 8 (description to follow) and its attached parsers (not shown).

In the preferred embodiment of the invention, a separate Edit Control 118 is created that keeps track of the Edit Views 119 and Edit Windows 120 associated with each specific level of detail (e.g. one of project, program, source file, function). When the methods of a node control 115 in the graphical layout control 113 are called by the browser application 110 to open a node (e.g. source node 54) in a Graph View for editing, and where an Edit Control 118 associated with the level of detail represented by the Graph View has not yet been opened, a new Edit Control 118 is created.

For example, an Edit Control 118 may be associated with all functions comprising a source file. In this case, the Edit Control 118 will have associated with it, Edit Views 119 each corresponding to a function in the source file. Code for one of the functions can be edited in an Edit Window 120 that is associated with the Edit View 119 for that function. The Edit Window 120 provides the associated Edit View 119 a frame (e.g. space on a windowing system with a border, system menu, toolbar, command menus) and allows for user interaction (e.g. editing, mouse clicks, toolbar button pressing, resizings) of the frame and the segment of code that corresponds to the Edit View 119.

Also associated with an Edit Control 118 is an Edit Manager 121 and various other components and data structures (122–131) which keep track of information relating to the specific instance of the Edit Control 118. The other components and data structures associated with the Edit Control 118 will be further described below.

In another embodiment of the invention, a single Edit Window 120 may alternately display selected Edit Views 119 while the nodes themselves are rendered as regular graphic nodes. In this embodiment, the Edit Control 118 consists of one Edit Window 120, associated with any of a number of Edit Views 119. The graphical links to the Edit Window 120 will be updated according to the Edit View 119 assigned to the Edit Window 120 at a given time.

The browser application 110 will, from time to time, update the nodes (e.g. root node 53 or source node 54 in FIGS. 1–3) and links (e.g. links 52 in FIGS. 1–3) being displayed in a Graph View by calling appropriate methods in the corresponding node controls 115 and link controls 116, to reflect any changes made to the code displayed in an Edit Window 120 for editing.

Properties of an Edit Window 120 will depend on the component being modified, and the Edit Window 120 may be composed of a number of menus, buttons, and display areas. In the preferred embodiment of the invention, the Edit Window 120 replaces the corresponding node control 115 in the Graph View. The user will also interact with the graphical layout control 113 in order to navigate, browse, and initiate editing in the various components displayed in the Graph View.

External programs may also affect the contents of Edit Windows 120. In an alternate use of the present invention, after program compilation, the user may select a command to display compiler error messages that may have been generated. The browser application 110 would then cause all Edit Windows 120 associated with Edit Views 119 corresponding to segments of code containing errors to be opened. The corresponding error messages may be displayed as read only lines intermixed with the text they refer to, or as lines in a separate display area of the respective Edit Windows 120.

Referring to FIG. 5, a flow diagram is provided that illustrates how the components of a program are displayed by the present invention. It will be obvious to those skilled in the art that there may be variations in the names, nature and number of levels in this diagram depending on the application, and this invention is intended to include those alternatives.

In the preferred embodiment of the invention. the graphical layout control 113 (FIG. 4) causes a hierarchical model (i.e. Graph View) of a project to be displayed at Step 132, which is a graphical representation of programs within a project. At this level, nodes in a Graph View (e.g. root nodes 53 or source nodes 54 of FIGS. 1–3) will represent programs within a project, and links in a Graph View (e.g. links 52 of FIGS. 1–3) will signify a relationship between programs.

Upon selecting a node that represents a specific program at Step 133, where such selection may be performed either by the user (for example, by pointing and clicking on the node using a mouse) or by an external program application (for example, by a debugger), a new Graph View is displayed at Step 134. The Graph View displayed at Step 134 is a conceptual model of the program as selected at Step 133, and may be embedded in the Graph View of the project displayed at Step 132, or alternatively, may replace the Graph View of the project displayed at step 132.

In a new Graph View displayed at Step 134, the nodes in the Graph View represent the source files of the program selected at Step 133, of the project being displayed at Step 132, and the links in the Graph View signify a relationship between source files. Upon selecting a node in the Graph View that represents a specific source file at Step 135, a new Graph View, such as shown in FIG. 1 for the file "sample.c" is displayed at Step 136.

In the new Graph View displayed at Step 136, the nodes in the Graph View represent functions (or procedures, methods, etc. as the case may be) which are contained in the source file selected at Step 135, and each link in the Graph View signifies a calling relationship between a function and another function, or in the case of a recursive call, a function and itself. Upon selecting a node in the Graph View that represents a specific function at Step 137, the code of the function as selected is displayed for editing within that node in the Graph View, such as shown in FIG. 2, at Step 138.

Referring to FIG. 6, a flow diagram illustrating the steps in a typical operational scenario of the present invention is provided. The operations performed in the preferred embodiment of the invention are described below. Furthermore, a more detailed description of the main components of a typical Edit Control 118 (FIG. 4) and a typical graphical layout control 113 (FIG. 4) are provided below, with emphasis on implementation details.

Starting the Browser Application

A browser application is loaded by the system and run at Step 150. A browser application window 112 (FIG. 4) is initialized and opened, the source code is read and parsed, and the initial Graph View is set up and displayed. Pseudo-code related to the implementation of this step is provided in Appendix "A".

The graphical layout control referred to in the pseudo-code of Appendix "A", is the graphical layout control 113 of FIG. 4. The graphical layout control 113 of FIG. 4 is implemented using a set of API (Application Programming Interface) functions utilized by the browser to create Graph Views comprising nodes (e.g. root nodes 53 or source nodes 54 of FIGS. 1–3) and links (e.g. links 52 of FIGS. 1–3). The graphical layout control 113 also automatically computes a layout such that the nodes in a Graph View are displayed in a balanced way and with minimal crossing of links in the Graph View. Manipulation of properties of the Graph View controlled by the graphical layout control 113 is also performed through the graphical layout control 113. For example, the user can select nodes and links in the Graph View to change their graphical attributes like colours, size, position, etc.

The Graph View is initially constructed from information stored in a database, or created dynamically (for example, by parsing the source code involved), which includes information about the nodes and links represented by their associated node controls 115 and link controls 116 respectively, and various default settings such as background, highlight, and selection colours, fill patterns, etc. Nodes and links in the Graph View are created and positioned in the Graph View according to the styles and methods that are supported by the graphical layout control 113, and any application-specific criteria.

Information on a node in the Graph View maintained by the graphical layout control 113 comprises:
  a) the name and ID of the node;
  b) graphic properties (the values needed to draw the node);
  c) contents (internal structure comprising text, a nested graph, etc.);
  d) internal and external labels for the node;
  e) state data (the type of the node, visibility information, sizing style);
  f) sizing data; and
  g) user-data pointers for applications to maintain information related to the node.

Information on a link in the Graph View maintained by the graphical layout control 113 comprises:
  a) the name and ID of the link;
  b) graphic attributes (colour, line type, line width, coordinates);
  c) arrow head information (source, destination);
  d) a text label;
  e) state data; and
  f) a user-data pointer.

User-interaction capabilities are also implemented in the graphical layout control 113 including: scrolling of the graph, zooming in and out, querying of the graph objects found at a particular location (for example, used by an application to identify the node in the Graph View activated upon selection by the user).

As previously noted, in the preferred embodiment of the present invention, the graphical layout control 113 also allows for the replacement of a node in a Graph View with an Edit Window 120 (FIG. 4) where the code corresponding to a component (i.e. an Edit View 119 of FIG. 4) may be edited. The graphical layout control 113 handles the processing and passing of system event notifications to and from the graphical layout control 113, but it otherwise treats the Edit Window 120 replacing the node in the Graph View as a node for other purposes including the laying out of the graph and the maintenance of links in the Graph View.

Alternatively, a node in the Graph View being opened for editing may be designated as application-controlled. The graphical layout control 113 handles the resizing and repositioning of a node, but a external application would maintain its own window in that space. The application will create and position the window and maintain two-way communication with the graphical layout control 113 regarding the size, position, and status of this window.

The appropriate source segment represented by a node in the Graph View (an entire source file, a class, or a function) is determined and set up by the browser application 110. This is done in conjunction with a live parser (not shown) attached to the Edit Control 118 for the particular file, which classifies and bounds (delimits) structural elements in the source. The visibility of the segment of interest is accomplished by marking the particular area(s) of interest in the file text, and hiding the rest through mark visibility settings in the Edit View 119. This process is further described in the next section.

The boundaries of the source segment represented by the node in the Graph View are maintained during editing by a live parser, which keeps the information up-to-date through incremental parsing.

Opening Node(s) for Editing/Editing Code in Opened Node(s)

Referring again to FIG. 6, the user requests at Step 152 that a node in the Graph View be opened for editing. In Step 152, an event observer (not shown) running under the control of the browser application 110 receives notification of the user's selection and request for the opening of a node in the Graph View for editing. The code of the component corresponding to the node in the Graph View can be subsequently edited. Pseudo-code related to the implementation of this Step is provided in Appendix "B".

As disclosed earlier, the Edit Control 118 (FIG. 4) referred to in the pseudo-code of Appendix "B", is a control that allows the user to browse and edit source code. It allows access to all the existing internal and external commands, profiles, and macros (stored in a profiles and macros data structure 130) of a stand alone editor.

An instance of the Edit Control 118 may consist of any number of these objects:

a) Edit View 119

This object controls one view of an edit document (e.g., a file or portion thereof loaded in the Edit Control 118). It allows the browser application 110 to manipulate the edit document through internal edit commands and external edit commands loaded in and run from the Edit Control 118, and through edit profiles and macros (stored in a profiles and macros structure 130, description to follow). The Edit View 119 is implemented by defining a class that comprises:

I) a constructor comprising the following parameters:
  i. edit document name: if the file is not yet opened, it is loaded, otherwise, a new view of the document is created;
  ii. optional pointer to associated Edit Window 120 object;
  iii. optional document type; and
  iv. other implementation-dependent options (e.g. edit profiles in the profiles and macro structure 130 to be run, and an end-of-line indicator).

II) class methods (not associated to a specific instance of the Edit View 119) comprising:
  i. setInstance(name): sets up an instance for the Edit View 119 object(s) to be created;
  ii. currentEditView( ): returns a pointer to the Edit View 119 object associated with the current Edit View 119; and
  iii. editCommand(edit command, parameters): executes an edit command which is not specific to a particular Edit View 119.

III) object methods comprising:
  i. editWindow( ): returns an object pointer for the Edit Window 120 object associated with the Edit View 119, if any;
  ii. setEditWindow(pointer to EditWindow): associates a specified Edit Window 120 with the current Edit View 119;
  iii. command (edit command, parameters): executes an edit command setting or queries an edit command setting; and
  iv. activate( ): a virtual function implemented in the application and called when the user has performed an action that would normally activate the Edit View 119, but where there is no Edit Window 120 associated with the Edit View 119. This function allows the application to associate an Edit Window 120 with the Edit View 1119 and give it focus, which may be useful in implementing navigation between the entities in a Graph View.

IV) notification members comprising:
  i. focusId: an identifier provided to observers of an Edit View 119, when the Edit Window 120 associated with the Edit View 119 receives or loses focus.

b) Edit Window 120

This object is a window that provides a user interface for an Edit View 119. An Edit Window 120 can be opened and resized in any of three sizes:

a) minimized—the original size of a node in a Graph View: This is the graphical rendering of the node in a Graph View (e.g. as illustrated in FIGS. 1–3 as a root node 53 or source node 54), labeled with the name of the entity which it represents (e.g. a function name).

b) regular—the node in a Graph View is an Edit View 119: The links in the Graph View (e.g. as illustrated in FIGS. 1–3 as links 52) to and from other nodes in the Graph View or Edit Views 119 (shown in Edit Windows 120) are displayed. This is the default editing mode in the preferred embodiment of the invention.

c) maximized—the node in a Graph View is an Edit View 119, enlarged up to the maximum application window size, or reasonably maximized inside the frame window 112 of the browser application 110.

Several Edit Windows 120 simultaneously open can be displayed as tiled or overlapping.

An Edit Window 120 is implemented by defining a class comprising:

I) a constructor comprising the following parameters:
  i. ID of the Edit Window 120;
  ii. parent/owner window(s) pointers;
  iii. the initial size and position for the Edit Window 120;
  iv. optional pointers to various control objects to be used by the Edit Window 120 (e.g, title bar, menu bar, toolbars, pop-up window, application-owned scroll bars, message bar); and v. other implementation-dependent options (e.g. Edit Window 120 characteristics such as borders and other properties).

II) object methods comprising:

i. set/remove control objects: e.g. setTitleBar, setMenuBar; and ii. textWindow: returns a pointer to the main text entry window, to allow the application to provide its own keyboard and mouse handlers (not shown). An Edit Window 120 will normally comprise several display areas (not shown), where the main text entry window is used to display the code being edited and to accept keyboard and mouse input. The handlers may use a method to map back a text entry display area to an Edit Window 120 from which they were called.

c) Edit Manager 121

The Edit Manager 121 is responsible for the instantiation and management of the various components of an Edit Control 118. Each instance of an Edit Control 118 supports and links a number of related Edit Views 119 and Edit Windows 120. All the EditViews 119 and Edit Windows 120 in the Edit Control 118 can access information about each other. They are also affected by changes to global edit settings and parameters, and allow navigation between themselves.

The Edit Manager 121 processes the internal commands of the programming environment. For example, the Edit Manager 121 handles the binding of internal commands or external commands and edit macros to key actions (stored in a key actions structure 131, description to follow), mouse actions, and menu items. When an action is received, it invokes the command bound to the action, if any.

d) Text Processing Component 122

The Text Processing component 122 handles the loading of documents into an edit buffer 126 (described below), all text editing and formatting operations, and the saving of the documents. Committed changes to the document are recorded in a stack for subsequent processing by a live parser (not shown). For example, this information may consist of pointers to the text elements that changed, to those that were added, and to a text element located before a text element that was deleted. The live parser will be invoked with these pointers, and will reparse these areas of the document.

e) Graphical User Interface Control 123

The Graphical User Interface Control 123 controls, builds and renders an Edit View 119 within an Edit Window 120. It manages the display attributes of the rendered elements as set up by an Edit Instance 118 and its attached tools. Examples of the display attributes managed by the Graphical User Interface Control 123 include the tokenization and colourization of the text associated with the Edit View 119 by a live parser, the non-document display-only elements and embedded messages within the Edit Window 120 (e.g. the error messages generated during compilation), and the filtering of elements in or out of the display as specified by the user or the browser application 110. Various events received within the browser application 110 as a result of the user manipulating the screen (e.g. window resizing and repositioning, and mouse-button actions) are processed, and the event notifications are passed on to, or generated for, the parent window that instantiated an Edit Window 120.

f) Command/Macros Interface 124

This component controls an interface to internal edit commands, external commands (code that is loaded in and run from an Edit Control 118), and edit macros, including live incremental parsers.

g) Edit Manager Structure 125

This data structure stores the global data associated with an Edit Control 118.

h) Edit Buffer 126

An edit buffer 126 comprises a linked list (or other suitable data structure) of all the text elements (as stored in element structures 127 described below) of a particular document.

i) Element Structures 127

These data structures store the text elements that make up an edit buffer 126. Different classes of text elements can be defined for a particular document (e.g. CODE, SPACE, SEMICOLON, FUNCTION, BRACE, FWDLINK, BWDLINK, ERROR, COMMENT, CONTROL). The text elements are obtained from the contents of the file loaded in an Edit Control 118. A text element can belong to one or more classes. Navigation between the elements through their classes (e.g., NEXT CLASS FUNCTION to move active point to the next element that belongs to class FUNCTION) is possible within an Edit Window 120.

In the preferred embodiment of the invention, the display attributes for each character in the text displayed in an Edit Window 120, are set by the tokenizer of a live parser (not shown) attached to the Edit Control 118. An element structure contains text contents, formatting flags and display attributes, and class information.

j) Document Control Structure 128

This data structure contains information to control the operations on a document in an Edit Control 118. One such structure is created for each document being edited. Classes are used to filter out text elements in the display of code in an Edit Window 120, and are used by the parsers to interpret the contents of an edit buffer 126 at various degrees of detail.

k) View Control Structure 129

This data structure contains data related to the control of an Edit View 119 for one document in an Edit Window 120. This includes, for example, display attributes defined for the Edit View 119, the size of the Edit View 119, the required visibility of text elements (for filtering/zooming in), and screen fields for the components of the edit buffer 126 being displayed in the Edit View 119.

l) Profiles and Macros Structure 130

This data structure stores the profiles and macros associated with an Edit Control 118. The profiles include information on default and user-specific settings and are set by the browser application 110, when, for example, an Edit Control 118 is instantiated or when a new document is opened. Settings in the Edit Control 118 that need to be adjusted when working with different platforms, file types, and applications can also be saved in a profile. A live parser is also attached to the Edit Control 118 using the particular edit profile that is invoked based on the specified type of the file loaded, or on its file name extension.

m) Key Actions Structure 131

This data structure stores the default actions for keys, key combinations, and mouse actions. These actions can be redefined, for example through an edit profile, macro, or external command, to activate any series of commands.

Navigating Between Windows

Returning now to FIG. 6, the user may wish to navigate between successive Edit Windows 120 in a Graph View as in Step 154. Pseudo-code related to the implementation of Step 154 is provided in Appendix "C". For example, navigation between successive Edit Windows 120 in a Graph View is necessary when the user wishes to switch from editing code in one Edit Window 120 to editing code in a different Edit Window 120.

The order in which Edit Windows 120 receive the current focus when a user navigates between Edit Views 119 of a document displayed in the Edit Windows 120, is dependent upon the order in which the Edit Views 119 were created. The order in which Edit Windows 120 receive the current focus may also depend upon user or application-specified settings and management options relating to how navigation between successive Edit Views 119 of the Edit Windows 120 is to be performed. For example, Edit Control 118 navigational keys can be redefined to allow for "hierarchical" navigation (i.e. moving between Edit Views 119 according to the calling relationships between components displayed in the Graph View).

In the preferred embodiment of the invention, once a document (i.e. the contents of an Edit Window 120) is updated, the Graph View in the Edit Window 120 is modified accordingly, if necessary.

Closing an Edit Window

Referring to FIG. 6, the user requests that an Edit Window 120 be closed as in Step 156. Pseudo-code related to the implementation of this step is provided in Appendix "D".

In the preferred embodiment of the invention, the graphical layout control 113 (FIG. 4) maintains a series of nested graphs, where a Graph View can replace a node in a higher-level Graph View, and each Graph View maintains its own structure of nodes and links. Each node in a function-level Graph View can be opened to display the underlying source code corresponding to the component represented by the node in the Graph View, which can be edited in an associated Edit Window 120 (FIG. 4).

In another embodiment of the invention, the graphical layout control 113 will permit the user upon selecting any node in a Graph View, to either display a new Graph View corresponding to the component represented by the node in the Graph View, or to display an Edit Window 120 that allows for the underlying source code corresponding to the component represented by the node in the Graph View to be edited, even if the node in the Graph View could, alternatively, be replaced by a separate Graph View.

The preferred embodiment of the disclosed invention can be implemented with a customizable edit control such as LPEX (the IBM Live Parsing Extensible editor), and a graphical hierarchical environment such as NARC/DG (the Nodes and Arcs/Directed Graph) graphical layout libraries, modified to support the properties of the invention herein described.

It will be apparent to those skilled in the art, that the application of the invention herein disclosed is not limited to programs based on the C programming language, nor is it limited to the graphical user interface or graphical layout used in the illustrations provided herein.

It can be appreciated that variations to this invention would be readily apparent to those skilled in the art, and this invention is intended to include those variations.

The embodiments of the invention in which an exclusive property or privilege is claimed are defined as follows:

1. A system for editing a computer program, said system comprising:
   a) a browser;
   b) a graphical layout control accessible to said browser, said graphical layout control being invoked by said browser to provide a display of relationships between components of said computer program;
   c) an edit control accessible to said browser, said edit control providing an interface permitting a user to select a component from within said display; and
   d) an edit window containing the contents of said selected component, said window replacing said selected component within said display, for the purpose of allowing the user to edit the contents of said selected component while viewing said display of relationships, said graphical layout control further comprises:
   a graphical manager, said graphical manager controlling the display of a graph view;
   a plurality of node controls accessible to said graphical manager, to implement the display of nodes within said graph view;
   a plurality of link controls accessible to said graphical manager, to implement the display of directional links between said nodes of said graph view;
   a plurality of nested graph layout controls, so that any graph view implemented by a graph layout control may replace a node in a higher-level graph view;
   a plurality of edit controls, each of said edit controls controlling a set of edit views and corresponding edit windows, said set corresponding to a specific level of detail within the source code being edited; said edit controls further comprises:
   an edit manager, said edit manager controlling the instantiation and management of the components within said edit control;
   a text processing component, said text processing component controlling the loading of source code segments to be edited within an edit view;
   a graphical user interface, said graphic user interface controlling the rendering of an edit view within an edit window;
   a commands/macros interface, said commands/macros interface providing an interface between internal and external edit commands and said edit control;
   an edit buffer, said edit buffer comprising a plurality of element structures, said element structures comprising text elements accessed by the text processing component;
   a document control structure, said document control structure controlling which text elements of said edit buffer are to be displayed in said edit window;
   a view control structure, providing control data for the display of an edit view;
   a profiles and macros structure, said structure storing the profile information for an edit view; and
   a key actions structure, said structure storing the default actions for keys and mouse selection for said edit control.

2. A system for editing a computer program, said program comprising a plurality of source code components, said system comprising:
   A) a browser;
   B) a graphical layout control accessible to said browser, said graphical layout control being invoked by said browser to display the relationships between said source code components as interconnected nodes, said graphical layout control further comprises:
   a graphical manager, said graphical manager controlling the display of a graph view;
   a plurality of node controls accessible to said graphical manager, to implement the display of nodes within said graph view;
   a plurality of link controls accessible to said graphical manager, to implement the display of directional links between said nodes of said graph view;
   C) a plurality of nested graph layout controls, so that any graph view implemented by a graph layout control may replace a node in a higher-level graph view;

D) a plurality of edit controls, each of said edit controls controlling a set of edit views and corresponding edit windows, said set corresponding to a specific level of detail within the source code being edited;

said edit controls further comprises:

- an edit manager, said edit manager controlling the instantiation and management of the components within said edit control;
- a text processing component, said text processing component controlling the loading of source code segments to be edited within an edit view;
- a graphical user interface, said graphic user interface controlling the rendering of an edit view within an edit window;
- a commands/macros interface, said commands/macros interface providing an interface between internal and external edit commands and said edit control;
- an edit buffer, said edit buffer comprising a plurality of element structures, said element structures comprising text elements accessed by the text processing component;
- a document control structure, said document control structure controlling which text elements of said edit buffer are to be displayed in said edit window;
- a view control structure, providing control data for the display of an edit view;
- a profiles and macros structure, said structure storing the profile information for an edit view; and
- a key actions structure, said structure storing the default actions for keys and mouse selection for said edit control;

E) each of said edit views corresponding to one of said source code components; and F) each of said edit windows providing a user interface to one of the source code component corresponding to an edit view, and a segment, thereby enabling the user to edit one of said source code component and segment.

* * * * *